(12) United States Patent
Narwal et al.

(10) Patent No.: US 9,136,733 B2
(45) Date of Patent: Sep. 15, 2015

(54) SYSTEM AND METHOD FOR SWITCHING BETWEEN A FIRST SUPPLY VOLTAGE AND A SECOND SUPPLY VOLTAGE OF A LOAD

(75) Inventors: Rajesh Narwal, Noida (IN); Shantanu Goel, Greater Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 1113 days.

(21) Appl. No.: 13/167,250

(22) Filed: Jun. 23, 2011

(65) Prior Publication Data

US 2012/0326517 A1    Dec. 27, 2012

(51) Int. Cl.
*H02J 1/00* (2006.01)
*H02J 3/00* (2006.01)
*H02J 9/06* (2006.01)
*G06F 1/04* (2006.01)
*G06F 1/26* (2006.01)
*H02M 1/14* (2006.01)

(52) U.S. Cl.
CPC . *H02J 9/061* (2013.01); *G06F 1/04* (2013.01); *G06F 1/26* (2013.01); *H02J 2009/068* (2013.01); *H02M 1/14* (2013.01); *Y10T 307/696* (2015.04)

(58) Field of Classification Search
CPC ........ H02J 2009/68; H02J 9/061; H02M 1/14
USPC .......................................................... 307/80
See application file for complete search history.

(56) References Cited

U.S. PATENT DOCUMENTS

| 7,375,442 B2 * | 5/2008 | Jablonski et al. ............... 307/75 |
| 2002/0135339 A1 * | 9/2002 | Tang et al. .................... 323/274 |
| 2010/0259106 A1 * | 10/2010 | Wang et al. .................... 307/80 |

* cited by examiner

*Primary Examiner* — Carlos Amaya
(74) *Attorney, Agent, or Firm* — Gardere Wynne Sewell LLP

(57) ABSTRACT

A system switches between application of a first supply voltage and a second supply voltage to a load. The second supply voltage is a regulated voltage that is generated from the first supply voltage, or is alternatively generated from a reference voltage, such as bandgap. When the load is supplied from the first supply voltage, the regulated voltage is also generated from the first supply voltage. At or after switching the load to the second supply voltage, the regulated voltage is generated instead from the reference voltage. The load is a clock circuit, such as an oscillator. The controlled switching of the supply voltage for the load in the manner described addresses concerns over introducing errors in the output clock signal when the clock circuit's supply voltage is changed.

24 Claims, 3 Drawing Sheets

SYSTEM AND METHOD FOR SWITCHING BETWEEN A FIRST SUPPLY VOLTAGE AND A SECOND SUPPLY VOLTAGE OF A LOAD

TECHNICAL FIELD

The present invention broadly relates to a system and method for switching between a first supply voltage and a second supply voltage of a load; to a load, and to a system for generating a frequency.

BACKGROUND

In electronic circuits, where two or more supplies are needed to operate the circuit and it is required to switch between the multiple supplies, it is typically necessary to assure a switch-over which does not lead to glitches. This requirement becomes more important in case of jitter-free, highly stable circuits. For example, in a frequency generating system, with high stability (minimum variation in frequency), where a regulator is being used to supply a voltage to an oscillator circuit, a smooth switch over is crucial.

However, in such circuits, variation in a core supply (VddCore) of a system-on-a-chip (SoC) typically introduces variation in frequency, and noise due to the high SoC current often results in jitter in the RC clock. Usually, to achieve a 1 microsecond (µs) start-up time, the oscillator can be started with 'VddCore' first. Subsequently, the supply voltage to the oscillator must be switched from 'VddCore' to a regulator output (VREG), which can provide an accurate frequency as desired. The switch-over from 'VddCore' to VREG should therefore be smooth (e.g. no overshoot/undershoot) and clean, to prevent any variation/jitter in frequency due to this switch-over.

Also, with low consumption and high power supply rejection ratio (PSRR) (e.g. −35 dB) criteria, the bandwidth of a conventional bandgap driven regulator system is typically restricted, thus making it a slow responding system. This results in a large settling time to attain the final voltage value when the system is switched from the core supply voltage to the regulated voltage. The large settling time can cause cycle-to-cycle jitter in the on-chip oscillator.

For example, VddCore can vary from 1.08 Volts (V) to 1.32V, while VREG remains stable at 1.2V. Thus, switching the supply or the load from 1.08V (or from 1.32V) to 1.2V may force the load to be suddenly provided with 1.2V instead of 1.08V (or 1.32V). Thus, this transition may become jittery and un-controlled.

A need therefore exists to provide a system and method for switching from a SoC core supply to a regulated supply that seek to address at least one of the above problems.

SUMMARY

In accordance with a first aspect of an example embodiment, there is provided a system for switching between a first supply voltage and a second supply voltage of a load, the system comprising: a supply configured to apply, at a first time, the first supply voltage to the load; a regulator circuit configured to apply, at a later second time, the second supply voltage to the load, the second supply voltage being a regulated output voltage of the regulator circuit; wherein the first supply voltage and the second supply voltage provide power to the load at the respective times, and wherein the supply is further configured, prior to the second time, to apply the first supply voltage to an input node of the regulator circuit.

The supply may be configured to be disconnected from the load prior or at the second time.

The system may further comprise a voltage reference circuit configured to apply, at a third time equal to or later than the second time, a reference voltage to the input node of the regulator circuit, wherein the supply may be configured to be disconnected from the input node of the regulator circuit prior or at the third time.

The regulator circuit may be configured, prior to the second time, to draw a sink current from the regulated output of the regulator circuit.

The sink current may be substantially equal to a load current drawn by the load.

The input node of the regulator circuit may comprise a node configured to receive a constant voltage.

The input node of the regulator circuit may be configured to receive the reference voltage via a low pass filter circuit.

A time constant of the low pass filter may be greater than an inverse of a bandwidth of the regulator circuit.

The regulator circuit may comprise a unity gain buffer circuit.

The voltage reference circuit may comprise a bandgap reference circuit.

In accordance with a second aspect of an example embodiment, there is provided a method for switching between a first supply voltage and a second supply voltage of a load, the method comprising: at a first time, applying the first supply voltage to the load; at a later second time, applying the second supply voltage to the load, the second supply voltage being a regulated output voltage of a regulator circuit; wherein the first supply voltage and the second supply voltage provide power to the load at the respective times, and wherein, prior to the second time, the first supply voltage is also applied to an input node of the regulator circuit.

The method may further comprise, prior to or at the second time, disconnecting the first supply voltage from the load.

The method may further comprise, prior to or at a third time equal to or later than the second time, disconnecting the first supply voltage from the input node of the regulator circuit, and at the third time, applying a reference voltage to the input node of the regulator circuit.

Prior to the second time, a sink current may be drawn from the regulated output of the regulator circuit.

The sink current may be substantially equal to a load current drawn by the load.

The input node of the regulator circuit may comprise a node at which a constant voltage is provided.

The reference voltage may be applied to the input node of the regulator circuit via a low pass filter circuit.

A time constant of the low pass filter may be greater than an inverse of a bandwidth of the regulator circuit.

The regulator circuit may comprise a unity gain buffer circuit.

The reference voltage may be generated from a voltage reference circuit, the voltage reference circuit comprising a band-gap reference circuit.

In accordance with a third aspect of an example embodiment, there is provided a load configured to receive, at a first time, a first supply voltage, and at a later second time, a second supply voltage, the second supply voltage being a regulated output voltage from a regulator circuit; wherein, prior to the second time, the first supply voltage is also applied to an input node of the regulator circuit.

The load may comprise an oscillator.

The load may comprise a phase-locked loop.

In accordance with a fourth aspect of an example embodiment, there is provided a system for generating a frequency, the system comprising: an oscillator configured to generate said frequency; a supply configured to provide a first supply voltage to the oscillator; a regulator circuit configured to provide a second supply voltage to the oscillator; and a system for switching between the first supply voltage and the second supply voltage as defined in the first aspect.

The system may further comprise a reference circuit configured to provide a reference voltage to the regulator circuit at a third time equal to or later than the second time, wherein the supply may be configured to be disconnected from the regulator circuit prior or at the third time.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
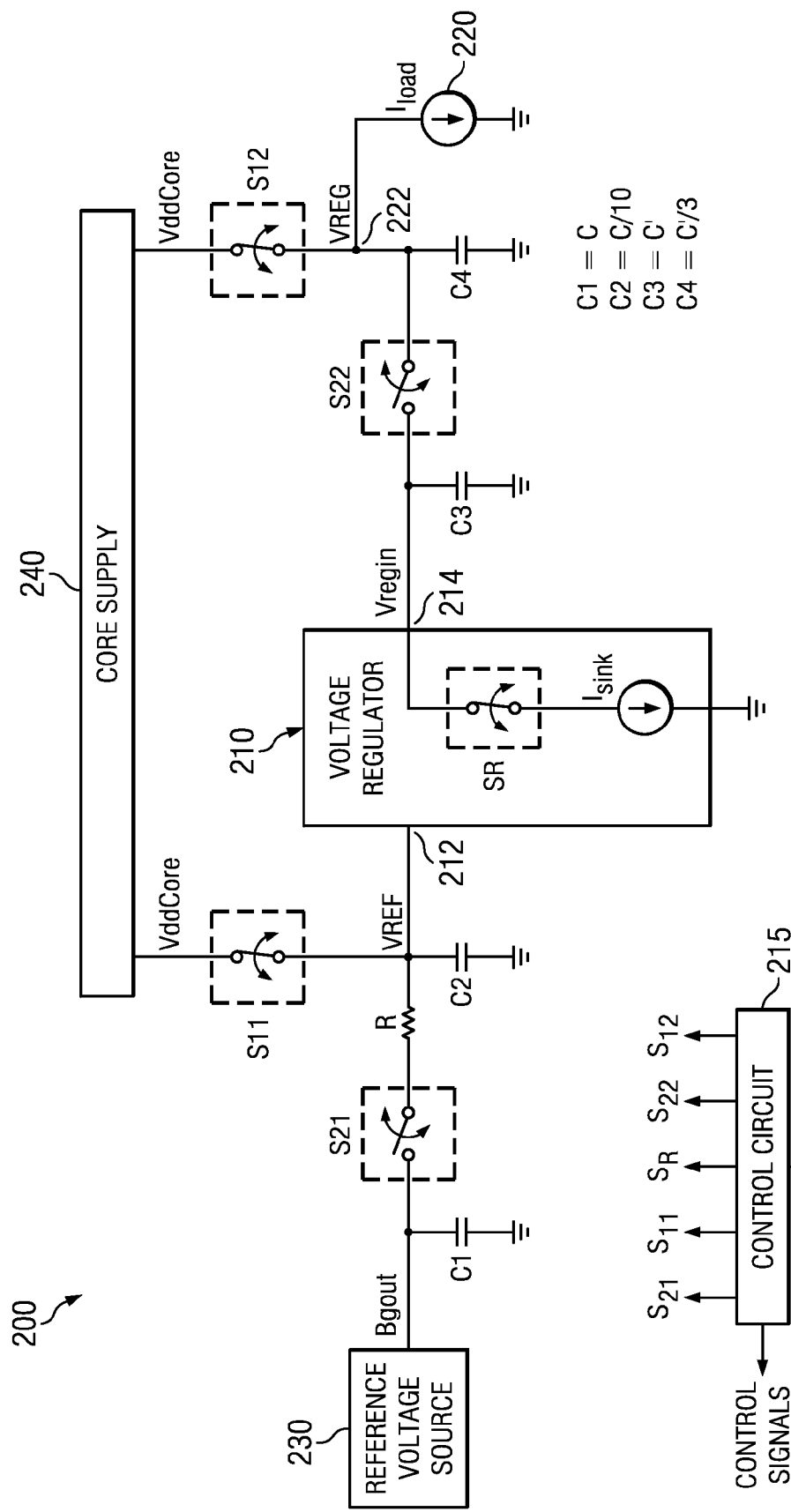
FIG. 1 shows a schematic circuit diagram illustrating a system for switching between a first supply voltage and a second supply voltage of a load according to an example embodiment at a time T1.
Figure 2:
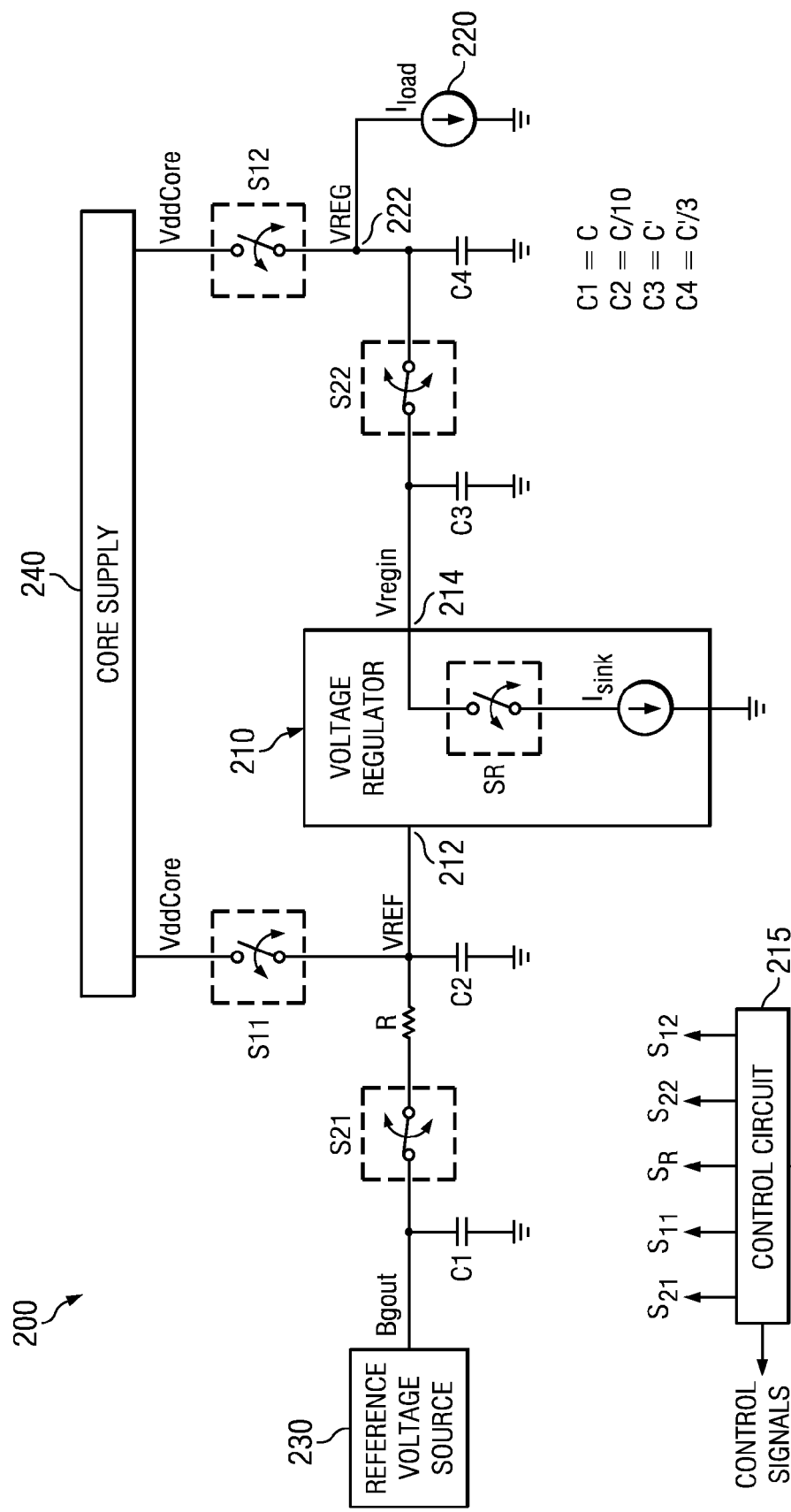
FIG. 2 shows a schematic circuit diagram illustrating the system of FIG. 1 at a time T2.

FIG. 1 shows a schematic circuit diagram illustrating a system 200 for switching between a first supply voltage and a second supply voltage of a load 220 according to an example embodiment at a time T1. FIG. 2 shows a schematic circuit diagram illustrating the system 200 of FIG. 1 at a time T2, later than time T1.

In an example embodiment, system 200 comprises a voltage regulator circuit 210 configured to receive a reference voltage signal from either a core supply 240, or a reference voltage source 230, e.g. a bandgap reference circuit generating a reference voltage, as input voltage. As shown in FIGS. 1 and 2, a switch S11 is coupled between an input node 212 of the voltage regulator circuit 210 and the core supply 240, and a switch S21 is coupled between the input node 212 of the voltage regulator circuit 210 and an output of the reference voltage source 230. The voltage regulator circuit 210 generates a regulated output voltage for outputting at an output node 214 based on the input voltage. In addition, the voltage regulator circuit 210 comprises circuit components (not shown) configured to generate a sink current $I_{sink}$ flowing from the output node 214 to a ground when a switch SR is closed.

As also shown in FIGS. 1 and 2, the load 220 is configured to receive a voltage signal from either the core supply 240 (i.e. the first supply voltage), or the voltage regulator circuit 210 (i.e. the second supply voltage) as input voltage. Here, a switch S12 is coupled between node 222 (which is the output node of system 200) and the core supply, and a switch S22 is coupled between the node 222 and the output node 214 of the voltage regulator circuit 210. During operation of the load 220, a current $I_{load}$ is drawn from node 222 through the load 220 and to a ground. The load 220 may comprise, but is not limited to, an RC oscillator, a phase-locked loop (PLL), etc.

System 200 further comprises circuit components such as resistor R and capacitors C1, C2, C3 and C4. For example, resistor R is coupled between the switch S21 and the input node 212, capacitor C1 is coupled between an output of the reference voltage source 230 and a ground, capacitor C2 is coupled between the input node 212 and a ground, capacitor C3 is coupled between the output node 214 and a ground, and capacitor C4 is coupled between the load input node 222 and a ground. A low-pass filter circuit comprising resistor R and capacitor C2 is thus provided between the reference voltage source 230 and the voltage regulator circuit 210. Examples of relative capacitance values of capacitors C1-C4 are shown in FIGS. 1 and 2. In an example embodiment, the value of C is in the range of about 10 picofarads (pF), while the value of C' is in the range of about 150 pF. However, it should be appreciated that different values and ratios may be used in alternate embodiments, depending on e.g. system requirements.

As illustrated, the voltage level provided by the core supply 240 is VddCore, the voltage level provided by the reference voltage source 230 is Bgout (a bandgap voltage, for example), the voltage level at the input node 212 is VREF, the voltage level at the output node 214 is Vregin, and the voltage level at the load input node 222 is VREG. For example, in an embodiment, VddCore=1.2V (can vary from about 1.08V to 1.32V), Bgout=1.2V+10 mV, VREG=1.2V+25 mV.

In an example embodiment, switches S11, S12, S21 and S22 are closed/opened in phases with respect to a start-up time of the reference voltage source 230 and the voltage regulator circuit 210 to effect the switch-over, as described in detail below. A control circuit 215 controls actuation of the switches as needed to operate the circuit.

Referring to FIG. 1, at time T1, switches S11 and S12 are closed while switches S21 and S22 are open. Thus, the voltage level at both the regulator input node 212 (i.e. VREF) and the load input node 222 (i.e. VREG) is VddCore. In an example embodiment, the voltage level Vregin at the regulator output node 214 is also equal to VddCore at this time (e.g. the voltage regulator 210 comprises a unity gain buffer circuit). The sink current $I_{sink}$ in the voltage regulator circuit 210 is generated from time T1. The sink current $I_{sink}$ is increased incrementally to attain a value which is approximately equal to the load current $I_{load}$. This allows the voltage at node 214 to attain its final value gradually without any sudden transition. The sink current $I_{sink}$ is designed with reference to Bgout (a constant voltage) to attain a value that is close to $I_{load}$ and with a knowledge of an approximate value of $I_{load}$. This approximate value is attempted to be available in $I_{sink}$ at the typical process (P), voltage (V), and temperature (T) conditions. Also, the regulator circuit 210 is set at an operating point which matches with a condition when node 222 is to supply the load current $I_{load}$. It is expected that variations due to PVT conditions do not significantly alter the outcome of equalizing the operating point before and after T2 (see below). In exemplary embodiments where the load 220 is an oscillator or a PLL, the start-up of the load current $I_{load}$ can be independent of T1. That is, the load current $I_{load}$ can be switched on at T1 or sometime after T1. In some embodiments, the switching on of the load current $I_{load}$ can be controlled via a switch (not shown). In a preferred embodiment, the load current $I_{load}$ drawn from the load input node 222 is switched on at time T1+ΔT to minimize noise due to simultaneous switching inside the load 220 and at switch S12.

Just before time T2 when the switching of supply to the load 220 is initiated, the voltage level Vregin at the regulator output node 214 is equal to the voltage level VddCore at the load input node 222 as discussed above, and the sink current $I_{sink}$ drawn from regulator output node 214 is set at a value close to the load current $I_{load}$ drawn from the load input node 222.

In an example embodiment, first, switch S12 is opened and after a very small delay switch S22 can be closed. It will be appreciated that even if this delay is not maintained, there should not be an issue as both voltage levels Vregin and VREG are at substantially the same value at this moment (Vregin may be slightly lower depending upon the offset of the regulator circuit 210). During this transition period, capacitors C3 and C4 are used to prevent the respective voltage levels from dropping. Along with the closing of switch S22, in the example embodiment, switch SR is opened such that the sink current $I_{sink}$ is replaced by the load current $I_{load}$. This helps to make sure that the biasing point for the regulator circuit 210 is substantially not changing much. In the next step, switch S11 is opened and switch S21 is closed. The voltage level VREF at node 212 finally reaches Bgout, depending upon the RC2 time constant. In a preferred embodiment, this time constant is chosen to be high such that there is no sudden change in the voltage level VREF, hence the voltage level VREG. The voltage level VREG is changed from VddCore to Bgout very gradually such that cycle to cycle jitter in clock can be reduced in the example embodiment.

In the example embodiments, the regulator circuit 210 comprises a voltage regulator circuit which regulates the voltage levels at node 214 and node 222 (when switch S22 is closed) at varying values of the load current $I_{load}$ (e.g. from about 0 µA to 300 µA). The regulator circuit 210 uses, for example, the output of the reference voltage source 230 to generate required voltage level at node 214. Here, the capacitor C2 is not intended to charge node 212, but rather, the resistor R and capacitor C2 are used as a low pass filter (LPF) for the voltage level Bgout (output of the reference voltage source 230). When switch S21 is closed, voltage level Bgout is applied to node 212, and the LPF is used in the example embodiments to eliminate any high frequency noise during this transition and, make transition from voltage level VddCore to voltage level Bgout. Also, the time constant RC2 is used in the example embodiments to determine the time in which the value of VREG is changed from value of VddCore to value of VREF. In a preferred embodiment, this time is chosen to be large in order to minimize the cycle to cycle jitter.

In the example embodiments, by opening switch S11 and closing switch S21, the regulator input node 212 is disconnected from the core supply 240 and coupled to the reference voltage source 230 at time T2. As a result, the voltage level VREF at the regulator input node 212 changes from VddCore to Bgout. Further, a time constant RC2 is chosen such that the voltage level VREF changes substantially slowly during and after this switch from the core supply 240 to the reference voltage source 230. For example, the time constant RC2 is chosen to be higher than (1/Bandwidth) of the voltage regulator circuit 210. This may provide a slow discharge of capacitor C2, hence a slow change in the voltage level VREF at the regulator input node 212. Thus, the voltage level VREG at the load input node 222 (which is equal to the voltage level Vregin at the regulator output node 214) slowly reaches a final value derived by the voltage level Bgout (which is now provided to the voltage regulator circuit 210). That is, system 200 of an example embodiment may generate substantially no voltage overshoot/undershoot or frequency variation/jitter during and after the switch from a core supply 240 to a reference voltage source 230.

Figure 3:
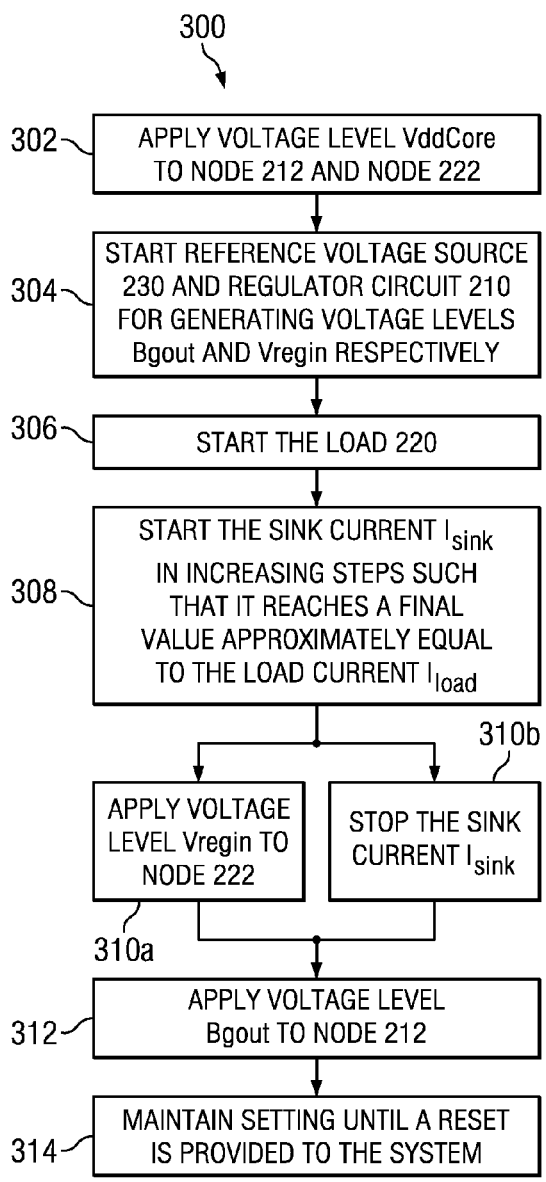
FIG. 3 show a flow chart illustrating a method for switching from a core supply voltage to a regulated voltage according to an example embodiment.

FIG. 3 shows a flow chart 300 illustrating a method for switching from a core supply voltage to a regulated voltage according to an example embodiment. At step 302, voltage level VddCore from the core supply 240 (FIG. 1) is applied to input node 212 of the regulator circuit 210 (FIG. 1), and to node 222 of the load 220 (FIG. 1). At step 304, the reference voltage source 230 (FIG. 1) and the regulator circuit 210 are started for generating voltage levels Bgout and Vregin respectively. At step 306, the load 220 (FIG. 1) is started. At step 308, the sink current $I_{sink}$ is started in increasing steps such that it reaches a final value approximately equal to the load current $I_{load}$.

After a stipulated time, in a preferred embodiment, first, Vregin is applied to node 222 (step 310a) and at the same time the sink current $I_{sink}$ is stopped (step 310b). Then, in the next step (step 312), voltage level Bgout is applied to input node 212 of the regulator circuit 210. The stipulated time can be, for example, the time for the voltage level Bgout to attain a stable value in all process, voltage and temperature conditions. In an alternate embodiment, voltage level Bgout is applied to input node 212 of the regulator circuit 210 simultaneously with the voltage level Vregin being applied to node 222 of the load 220 and the stopping of the sink current $I_{sink}$. At step 314, the setting attained at this point is maintained until a reset is provided to the system.

In the example embodiment, control signals, for example one to draw the sink current $I_{sink}$ in increasing steps, another to apply the voltage level Bgout to the regulator input node 212, and another to apply the voltage level Vregin to node 222, are generated with reference to a clock signal. For example, the clock signal is an output of the load 220, which is an oscillator in the example embodiment. These control signals can be generated by the control circuit 215 which receives a clock input.

In an alternate embodiment, the application of voltage level Bgout to node 212 and the application of voltage level Vregin to node 222 can be done at different times. In yet another embodiment, the load 220 can be configured to start only after the voltage levels Bgout and Vregin have attained respective stable values.

Figure 4:
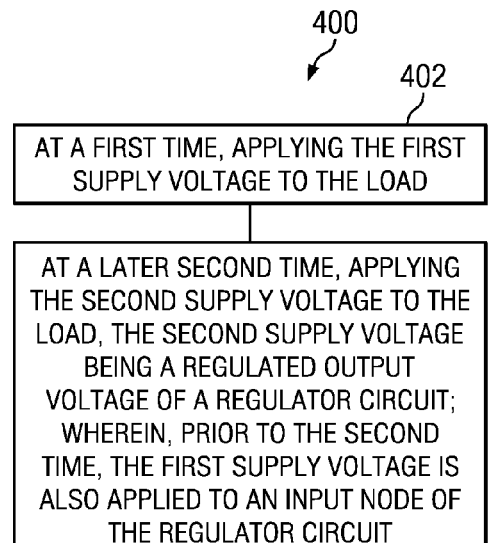
FIG. 4 shows a flow chart illustrating a method for switching between a first supply voltage and a second supply voltage of a load according to an example embodiment.

FIG. 4 shows a flow chart 400 illustrating a method for switching between a first supply voltage and a second supply voltage of a load according to an example embodiment. At step 402, at a first time, the first supply voltage is applied to the load. At step 404, at a later second time, the second supply voltage is applied to the load, the second supply voltage being a regulated output voltage of a regulator circuit; wherein the first supply voltage and the second supply voltage provide power to the load at the respective times, and wherein, prior to the second time, the first supply voltage is also applied to an input node of the regulator circuit.

Figure 5:
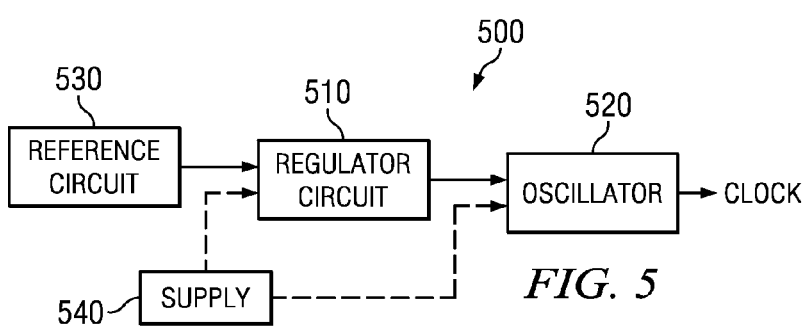
FIG. 5 shows a block diagram illustrating a system for generating a frequency according to an example embodiment.

FIG. 5 shows a block diagram illustrating a system 500 for generating a frequency according to an example embodiment. System 500 comprises an oscillator 520, a supply 540 coupled to the oscillator 520 for providing a first supply voltage to the oscillator 520, a regulator circuit 510 coupled to the oscillator 520 for providing a second supply voltage to the oscillator 520, and a reference circuit 530 coupled to the regulator circuit 510 for providing a reference voltage to the regulator circuit 510. The oscillator 520, e.g. an RC oscillator, is capable of generating a selected frequency, e.g. from a range of possible frequencies. In an example embodiment, system 500 employs the mechanism for switching between the first supply voltage and the second supply voltage, as described above with respect to FIGS. 2 and 3. For example, in FIG. 5, the solid lines show connections after the switch to the second supply voltage is completed (the dotted lines show alternative connections for the first supply voltage).

While this detailed description has set forth some embodiments of the present invention, the appended claims cover other embodiments of the present invention which differ from the described embodiments according to various modifications and improvements. For example, other types of reference voltage source may be used in place of the bandgap reference circuit. Also, the values of R, C1-C4, and thus the time constant RC2, may be adjusted accordingly based on e.g. operation requirements.

Within the appended claims, unless the specific term "means for" or "step for" is used within a given claim, it is not intended that the claim be interpreted under 35 U.S.C. 112, paragraph 6.

What is claimed is:

1. A system for switching between a first supply voltage and a second supply voltage of a load, the system comprising:
   first circuitry configured to apply, at a first time, the first supply voltage to the load;
   a regulator circuit configured to generate the second supply voltage, the second supply voltage being a regulated output voltage of the regulator circuit;
   second circuitry configured to apply, at a later second time, the second supply voltage to the load; and
   third circuitry configured, prior to the second time, to apply the first supply voltage to an input node of the regulator circuit;
   a voltage reference circuit configured to generate a reference voltage; and
   fourth circuitry configured to apply, at a third time equal to or later than the second time, the reference voltage to the input node of the regulator circuit;
   wherein the first supply voltage and the second supply voltage provide power to the load at the respective times.

2. The system as claimed in claim 1, wherein the first circuitry is further configured to terminate application of the first supply voltage to the load prior to or at the second time.

3. The system as claimed in claim 1, wherein the third circuitry is further configured to terminate application of the first supply voltage to the input node of the regulator circuit prior to or at the third time.

4. The system as claimed in claim 1, wherein the input node of the regulator circuit is configured to receive the reference voltage via a low pass filter circuit.

5. The system as claimed in claim 4, wherein a time constant of the low pass filter is greater than an inverse of a bandwidth of the regulator circuit.

6. The system as claimed in claim 1, wherein the voltage reference circuit comprises a bandgap reference circuit.

7. The system as claimed in claim 1, wherein the regulator circuit is configured, prior to the second time, to draw a sink current from the regulated output of the regulator circuit.

8. The system as claimed in claim 7, wherein the sink current is substantially equal to a load current drawn by the load.

9. The system as claimed in claim 1, wherein the input node of the regulator circuit comprises a node configured to receive a constant voltage.

10. The system as claimed in claim 1, wherein the regulator circuit comprises a unity gain buffer circuit.

11. A method for switching between a first supply voltage and a second supply voltage of a load, the method comprising:
   at a first time, applying the first supply voltage to the load;
   at a later second time, applying the second supply voltage to the load, the second supply voltage being a regulated output voltage of a regulator circuit;
   prior to the second time, applying the first supply voltage to an input node of the regulator circuit;
   prior to or at a third time equal to or later than the second time, disconnecting the first supply voltage from the input node of the regulator circuit; and
   at the third time, applying a reference voltage to the input node of the regulator circuit;
   wherein the first supply voltage and the second supply voltage provide power to the load at the respective times.

12. The method as claimed in claim 11, further comprising, prior to or at the second time, stopping application of the first supply voltage to the load.

13. The method as claimed in claim 11, wherein, prior to the second time, a sink current is drawn from the regulated output of the regulator circuit.

14. The method as claimed in claim 13, wherein the sink current is substantially equal to a load current drawn by the load.

15. The method as claimed in claim 11, wherein the input node of the regulator circuit comprises a node at which a constant voltage is provided.

16. The method as claimed in claim 11, wherein the reference voltage is applied to the input node of the regulator circuit via a low pass filter circuit.

17. The method as claimed in claim 16, wherein a time constant of the low pass filter is greater than an inverse of a bandwidth of the regulator circuit.

18. A system for supplying voltage to a load node, comprising:
   a first switching circuit configured to couple, at a first time, a first supply voltage node to the load node;
   a second switching circuit configured to couple, and at a later second time, a second supply voltage node to the load node;
   a regulator circuit configured to generate a regulated output voltage at the second supply voltage node;
   a third switching circuit configured, prior to the second time, to couple the first supply voltage node to a supply voltage input of the regulator circuit;
   a reference voltage generator circuit configured to generate a reference voltage at a reference voltage node; and
   a fourth switching circuit configured to couple, at a third time equal to or later than the second time, the reference voltage node to the supply voltage input of the regulator circuit.

19. The system of claim 18, wherein said first switching circuit is further configured to uncouple the first supply voltage node from the load node prior to or at the second time.

20. The system of claim 18, wherein said third switching circuit is further configured to uncouple, after the second time, the first supply voltage node from the supply voltage input of the regulator circuit.

21. The system of claim 18, further comprising an oscillator coupled to the load node.

22. The system of claim 18, further comprising a phase-locked loop coupled to the load node.

23. A system, comprising:
   a load circuit;
   a first supply voltage node configured to provide a first supply voltage;
   a second supply voltage node configured to provide a second supply voltage;
   a first switching circuit configured to switch between a first mode wherein the load circuit is coupled to the first supply voltage node to receive the first supply voltage and a second mode wherein the load circuit is coupled to the second supply voltage node to receive the second supply voltage;

a regulator circuit configured to generate the second supply voltage at the second supply voltage node;

a reference circuit configured to generate a reference voltage at a reference voltage node; and a second switching circuit configured to switch between supplying an input of the regulator circuit with the first supply voltage and the reference voltage from the reference voltage node.

24. The system as claimed in claim 23, wherein the second switching circuit supplies the input of the regulator circuit with the first supply voltage in the first mode, and switches to supply the input of the regulator circuit with the reference voltage at or after the first switching circuit switches from the first mode to the second mode.

* * * * *